US012461485B2

(12) United States Patent
Chen

(10) Patent No.: US 12,461,485 B2
(45) Date of Patent: Nov. 4, 2025

(54) POSITIONING ADAPTER, ADAPTER, AND CARTRIDGE

(71) Applicant: Zhuhai Pantum Electronics Co., Ltd., Zhuhai (CN)

(72) Inventor: Feng Chen, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/767,663

(22) Filed: Jul. 9, 2024

(65) Prior Publication Data

US 2025/0021047 A1 Jan. 16, 2025

(30) Foreign Application Priority Data

Jul. 10, 2023 (CN) ......................... 202310845551.7

(51) Int. Cl.

| | |
|---|---|
| ***G03G 15/00*** | (2006.01) |
| ***G03G 21/16*** | (2006.01) |
| ***G03G 21/18*** | (2006.01) |

(52) U.S. Cl.

CPC ..... *G03G 21/1871* (2013.01); *G03G 21/1652* (2013.01); *G03G 21/1842* (2013.01); *G03G 21/1857* (2013.01)

(58) Field of Classification Search

CPC ........... G03G 15/0865; G03G 21/1652; G03G 21/1842; G03G 21/1857; G03G 21/1871

USPC .................................... 399/90, 107, 110, 111

See application file for complete search history.

(56) References Cited

U.S. PATENT DOCUMENTS

| | | | | |
|---|---|---|---|---|
| 5,926,666 | A | 7/1999 | Miura et al. | |
| 6,014,533 | A | 1/2000 | Kawana | |
| 9,360,834 | B1 | 6/2016 | Payne et al. | |
| 9,429,908 | B2 | 8/2016 | Uto et al. | |
| 9,989,917 | B1 | 6/2018 | Hale et al. | |
| 10,520,879 | B2 * | 12/2019 | Kiriyama | G03G 15/0865 |
| 10,725,422 | B2 | 7/2020 | Amann et al. | |
| 10,761,476 | B1 | 9/2020 | Leemhuis et al. | |
| 2013/0343777 | A1 | 12/2013 | Amann et al. | |
| 2022/0075286 | A1 | 3/2022 | Fukasawa et al. | |
| 2023/0176514 | A1 | 6/2023 | Itabashi et al. | |

FOREIGN PATENT DOCUMENTS

| | | |
|---|---|---|
| EP | 3693810 A1 | 8/2020 |
| RU | 2606929 C2 | 1/2017 |

* cited by examiner

*Primary Examiner* — Hoan H Tran

(74) *Attorney, Agent, or Firm* — Anova Law Group, PLLC

(57) ABSTRACT

A positioning adapter is installed on a cartridge that is detachably disposed on a main body of an image forming apparatus. The main body includes a first driving head, a first conductive contact, and a first positioning matching part. The cartridge includes a storage apparatus, with a second conductive contact, and a first meshing part. When the cartridge with the positioning adapter is inserted and installed into the main body, a first positioning part is configured to cooperate with the first positioning matching part to position the first meshing part, stabilizing a transmission-connection between the first meshing part and the first driving head. A maximum width of an outermost contour of the first positioning part is greater than or equal to a maximum line distance between any two of multiple contacts where the first conductive contact contacts the second conductive contact on the transverse cross-section of the main body.

20 Claims, 8 Drawing Sheets

POSITIONING ADAPTER, ADAPTER, AND CARTRIDGE

CROSS-REFERENCE TO RELATED APPLICATION

This application claims priority to Chinese Patent Application No. 202310845551.7, filed on Jul. 10, 2023, the entire content of which is incorporated herein by reference.

TECHNICAL FIELD

The present disclosure relates to the technical field of printing equipment and, in particular, to a positioning adapter, an adapter, a cartridge, a cartridge assembly, and an image forming apparatus.

BACKGROUND

An image forming apparatus is an apparatus that forms an image on a medium through imaging processing technology. The image forming apparatus includes a main body of the image forming apparatus and a toner cartridge assembly composed of one or more toner cartridges. The main body of the image forming apparatus is provided with an imaging assembly. The toner cartridge is usually detachably installed into the main body of the image forming apparatus and can provide toner to the imaging assembly for printing.

The image forming apparatus includes a driving head. A first conductive contact is provided on a side of the main body of the image forming apparatus. A second conductive contact is provided on the toner cartridge. When the toner cartridge is inserted into the main body of the image forming apparatus, the first conductive contact of the main body of the image forming apparatus and the second conductive contact of the toner cartridge are in contact and electrically connected. At the same time, the driving head in the image forming apparatus is transmission-connected to the toner cartridge and provides rotational force to the toner cartridge to rotate a toner transportation apparatus in the toner cartridge.

On the other hand, when the image forming apparatus drives the toner cartridge, a rotation of the driving head of the image forming apparatus can give an axial rotational force to the toner cartridge. This rotational force will cause the toner cartridge to swing, further causing relative movement between the first conductive contact and the second conductive contact in the image forming apparatus. This results in unstable electrical connection between the first conductive contact and the second conductive contact, thereby affecting the normal operation of the image forming apparatus.

SUMMARY

One aspect of the present disclosure provides a positioning adapter. The positioning adapter is installed on a cartridge. The cartridge is detachably disposed on a main body of an image forming apparatus. The main body of the image forming apparatus has a first driving head, a first conductive contact, and a first positioning matching part. The cartridge includes a storage apparatus and a first meshing part. The storage apparatus has a second conductive contact. The positioning adapter has a first positioning part. When the cartridge with the positioning adapter is inserted into the main body of the image forming apparatus and installed in place, the first positioning part is configured to cooperate with the first positioning matching part to position the first meshing part, stabilizing a transmission-connection between the first meshing part and the first driving head. When the cartridge with the positioning adapter is inserted into the main body of the image forming apparatus and installed in place, the first conductive contact contacts the second conductive contact. When the cartridge with the positioning adapter is inserted into the main body of the image forming apparatus and installed in place, a maximum width of an outermost contour of the first positioning part on a transverse cross-section of the main body of the image forming apparatus is greater than or equal to a maximum line distance between any two of multiple contacts where the first conductive contact contacts the second conductive contact on the transverse cross-section of the main body of the image forming apparatus.

One aspect of the present disclosure provides an adapter. The adapter can be detachably installed on a cartridge. The cartridge is detachably disposed on a main body of an image forming apparatus. The main body of the image forming apparatus includes a first driving head, a first conductive contact, and a first positioning matching part. The cartridge has a storage apparatus and an installation part for installing a first meshing part. The storage apparatus has a second conductive contact. The adapter has a first positioning part. When the cartridge with the first positioning part and the first meshing part is inserted into the main body of the image forming apparatus and installed in place, the first positioning part is configured to cooperate with the first positioning matching part to position the first meshing part, stabilizing a transmission-connection between the first meshing part and the first driving head. When the cartridge with the first positioning part is inserted into the main body of the image forming apparatus and installed in place, the first conductive contact contacts the second conductive contact. When the cartridge with the first positioning part is inserted into the main body of the image forming apparatus and installed in place, a maximum width of an outermost contour of the first positioning part on a transverse cross-section of the main body of the image forming apparatus is greater than or equal to a maximum line distance between any two of multiple contacts where the first conductive contact contacts the second conductive contact on the transverse cross-section of the main body of the image forming apparatus.

One aspect of the present disclosure provides a cartridge. The cartridge is detachably disposed on a main body of an image forming apparatus. The image forming apparatus includes a first driving head, a first conductive contact, and a first positioning matching part. The cartridge includes a housing, a first meshing part, a first positioning part, and a storage apparatus. The first meshing part is configured to transmission-connect with the first driving head. The first positioning part is disposed on the housing. When the cartridge is inserted into the main body of the image forming apparatus and installed in place, the first positioning part is configured to cooperate with the first positioning matching part to position the first meshing part, stabilizing a transmission-connection between the first meshing part and the first driving head. The storage apparatus has a second conductive contact. The storage apparatus is configured to electrically connect to the first conductive contact of the image forming apparatus. When the cartridge is inserted into the main body of the image forming apparatus and installed in place, the first conductive contact contacts the second conductive contact. When the cartridge is inserted into the main body of the image forming apparatus and installed in place, a maximum width of an outermost contour of the first positioning part on a transverse cross-section of the main body of the image forming apparatus being greater than or equal to a maximum line distance between any two of multiple contacts where the first conductive contact contacts the second conductive contact on the transverse cross-section of the main body of the image forming apparatus.

Another aspect of the present disclosure provides a cartridge assembly. The cartridge assembly is detachably installed on a main body of an image forming apparatus. The cartridge assembly includes a plurality of cartridges. The image forming apparatus includes a first driving head, a first conductive contact, and a first positioning matching part. The cartridge includes a housing, a first meshing part, a first positioning part, and a storage apparatus. The first meshing part is configured to transmission-connect with the first driving head. The first positioning part is disposed on the housing. When the cartridge is inserted into the main body of the image forming apparatus and installed in place, the first positioning part is configured to cooperate with the first positioning matching part to position the first meshing part, stabilizing a transmission-connection between the first meshing part and the first driving head. The storage apparatus has a second conductive contact. The storage apparatus is configured to electrically connect to the first conductive contact of the image forming apparatus. When the cartridge is inserted into the main body of the image forming apparatus and installed in place, the first conductive contact contacts the second conductive contact. When the cartridge is inserted into the main body of the image forming apparatus and installed in place, a maximum width of an outermost contour of the first positioning part on a transverse cross-section of the main body of the image forming apparatus being greater than or equal to a maximum line distance between any two of multiple contacts where the first conductive contact contacts the second conductive contact on the transverse cross-section of the main body of the image forming apparatus.

BRIEF DESCRIPTION OF THE DRAWINGS

In order to better convey embodiments of the present disclosure or the technical solutions, a brief introduction will be described below to the drawings that need to be used in the description of embodiments or technical solutions. Obviously, the drawings in the following description are some embodiments of the present disclosure. For those persons of ordinary skill in the art, other drawings can be obtained based on these drawings without exerting any creative effort.

DETAILED DESCRIPTION OF THE EMBODIMENTS

Figure 1:
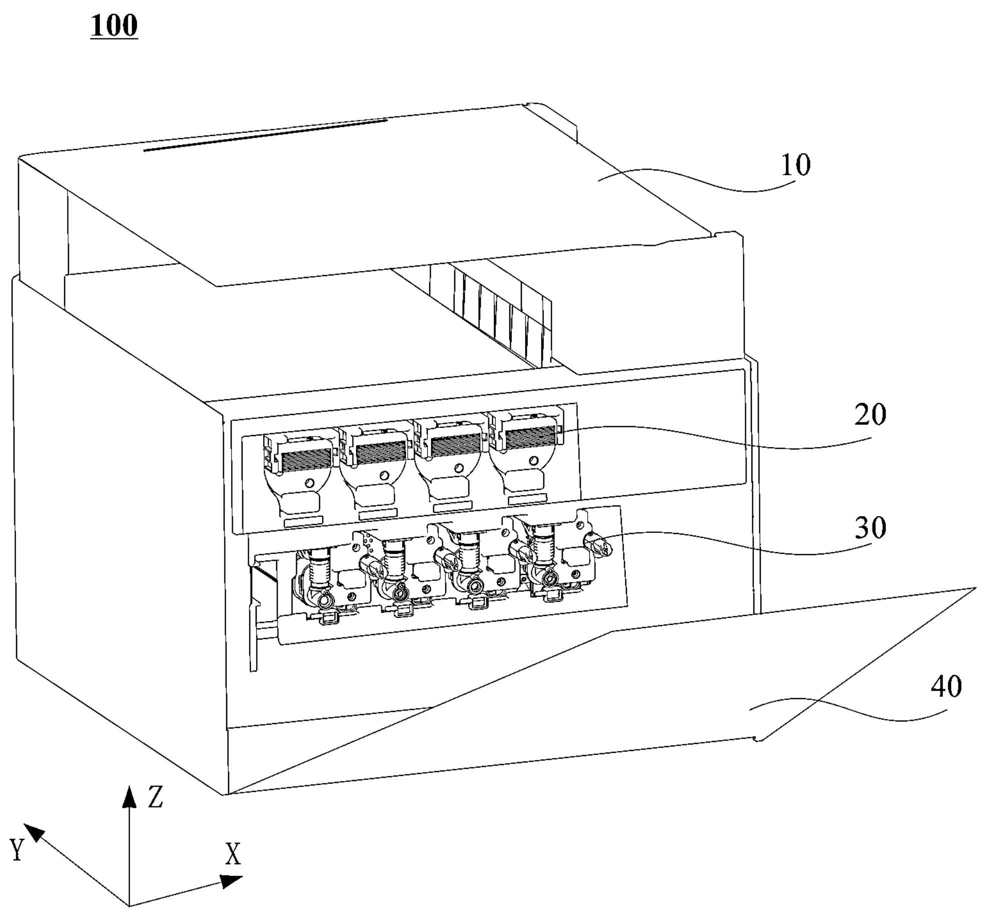
FIG. 1 illustrates a schematic diagram of opening the front cover of an image forming apparatus according to various embodiments of the present disclosure.

As mentioned in the background, when the toner cartridge is inserted into a main body of an image forming apparatus, an electrical connection between the first conductive contact on a side of the main body of the image forming apparatus and the second conductive contact on the toner cartridge is unstable, affecting the normal operation of the image forming apparatus. The origin of the issue is when the toner cartridge is inserted into the main body, the driving head in the image forming apparatus is transmission-connected to the toner cartridge and provides rotational force to the toner cartridge to rotate a toner transportation apparatus in the toner cartridge. Thus, the toner cartridge can provide toner to the image forming apparatus.

In the image forming apparatus, the rotational force easily causes relative movement between the first conductive contact and the second conductive contact, resulting in unstable electrical connection between the two, thereby affecting the normal operation of the image forming apparatus.

To address the technical issue, embodiments of the present disclosure provide a positioning adapter, an adapter, a cartridge, a cartridge assembly, and an image forming apparatus. The positioning adapter is installed on the cartridge. The positioning adapter matches with a first positioning matching part provided on the main body of the image forming apparatus through the first positioning part of the positioning adapter to position the first meshing part. Thus, the first meshing part is transmission-connected with a first driving head, to detachably install the cartridge on the main body. Moreover, the first conductive contact on the side of the main body of the image forming apparatus contacts the second conductive contact on the cartridge to form a plurality of contacts.

Furthermore, in embodiments of the present disclosure, a maximum width of an outermost contour of the first positioning part on the transverse cross-section of the main body of the image forming apparatus is configured to be greater than or equal to a maximum line distance between any two contacts of the plurality of contacts where the first conductive contact and the second conductive contact are in contact on the transverse cross-section of the main body of the image forming apparatus. This arrangement can reduce the influence of the driving force from the first driving head on the contact between the first conductive contact and the second conductive contact, thereby avoiding relative movement between the first conductive contact and the second conductive contact, ensuring a more stable contact between the first conductive contact and the second conductive contact. This ensures normal operation of the image forming apparatus.

To make the above purposes, features, and advantages of embodiments of the present disclosure more obvious and easier to understand, the technical solutions in embodiments of the present disclosure will be clearly and completely described below in conjunction with the drawings in embodiments of the present disclosure. Obviously, the described embodiments are only some of the embodiments of the present disclosure, not all the embodiments. Based on embodiments of the present disclosure, all other embodiments obtained by those persons of ordinary skill in the art without any creative work shall fall within the scope of protection of the present disclosure.

Embodiment I

In order to better describe embodiments of the present disclosure, the coordinate system in the drawings is first described, in which the X-axis is defined as a first direction. The first direction can be a length direction of the main body 10 of the image forming apparatus, or can also be regarded as the left-right direction. The Y-axis direction is defined as a second direction, and the second direction can be a width direction of the main body 10 of the image forming apparatus, or can also be regarded as the front-back direction. The Z-axis direction is defined as a third direction, and the third direction can be a height direction of the main body 10 of the image forming apparatus, or can also be regarded as the up-down direction.

Figure 2:
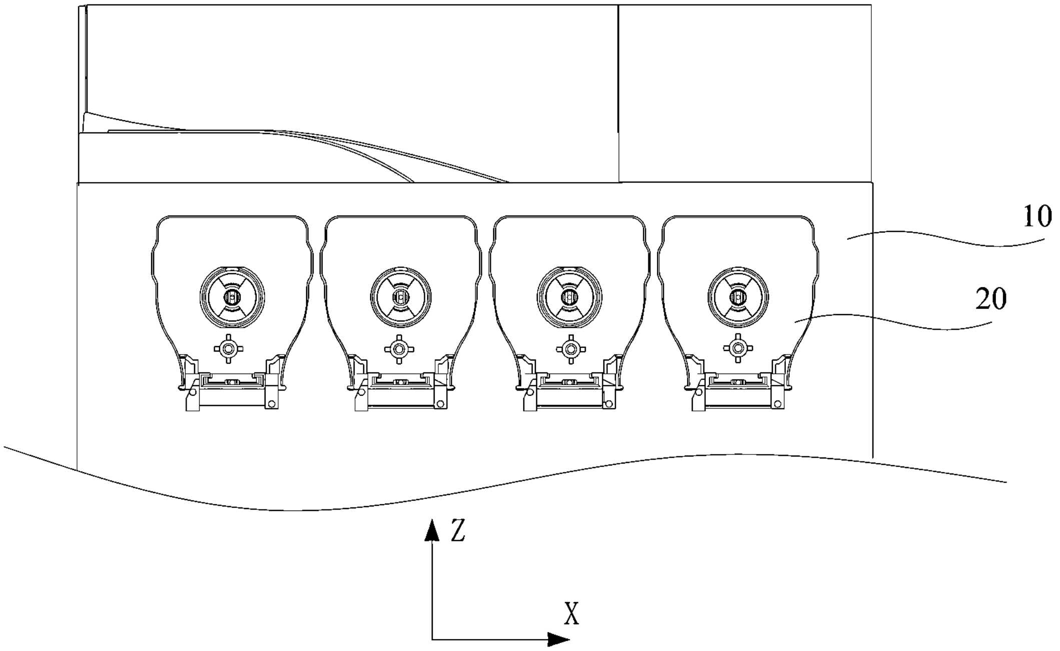
FIG. 2 illustrates schematic diagram of a cross-sectional view of a cartridge being installed into an image forming apparatus according to various embodiments of the present disclosure.

As shown in FIG. 1 and FIG. 2, the image forming apparatus 100 provided by embodiments of the present disclosure includes a main body 10 as well as a cartridge assembly and imaging assembly 30 installed in the main body 10. The main body 10 includes an installation cavity. Along the second direction, the front end of the installation cavity has an opening to facilitate installing the cartridge assembly and the imaging assembly 30 into the installation cavity.

Specifically, the main body 10 of the image forming apparatus is in a rectangular shape, and is provided with an installation cavity. The installation cavity is rectangular or irregular shapes. A front end of the installation cavity has an opening. An openable front cover 40 is provided at the edge of the opening. When the front cover 40 is in a closed state, it can seal the opening to seal the installation cavity. In embodiments of the present disclosure, the cartridge assembly can include at least one cartridge 20, and the cartridge assembly can be inserted into the installation cavity, that is, the cartridge assembly can be detachably installed into the main body 10. Furthermore, the image forming apparatus 100 can be equipped with at least one cartridge. The cartridge 20 can be a toner cartridge containing toner for printing.

Along the third direction, the cartridge assembly can be disposed above the imaging assembly 30. The cartridge assembly includes four toner cartridges arranged sequentially along the first direction. Each cartridge can contain toners of different colors. In this embodiment, there is no restrictions. When the toner cartridge is installed into the installation cavity and positioned, the toner cartridge can provide toner to the imaging assembly 30. The toner cartridge is electrically connected to the image forming apparatus 100 for communication.

Figure 3:
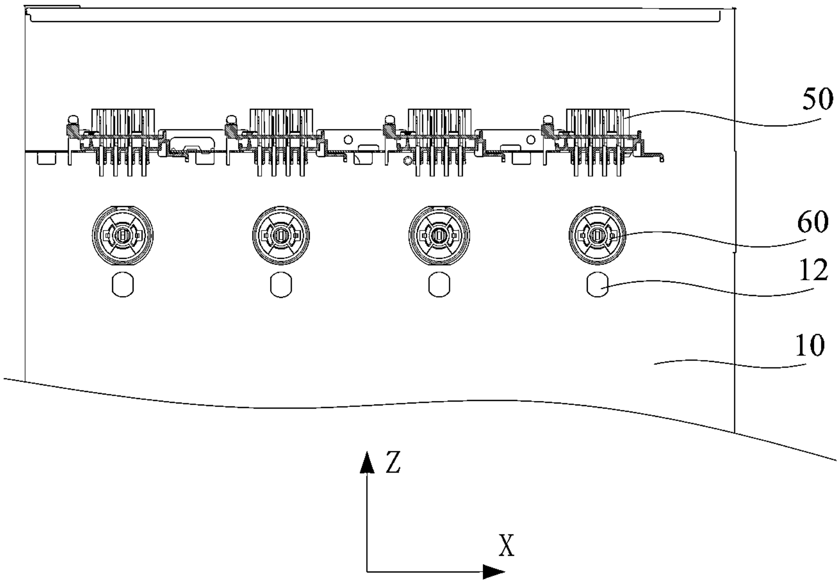
FIG. 3 illustrates a schematic structural diagram of a main body of an image forming apparatus according to various embodiments of the present disclosure.
Figure 6:
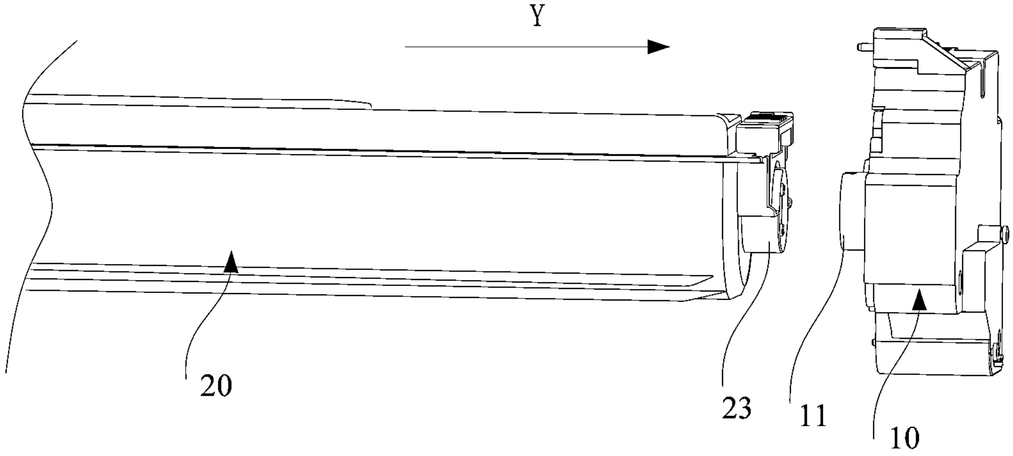
FIG. 6 illustrates a first schematic diagram of the cartridge being inserted into the main body according to various embodiments of the present disclosure.
Figure 7:
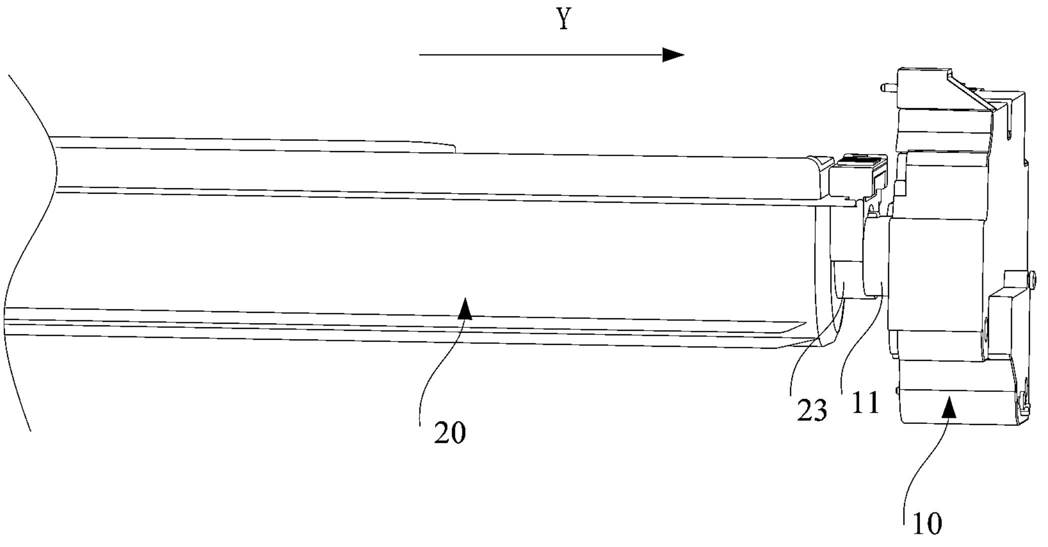
FIG. 7 illustrates a second schematic diagram of the cartridge being inserted into the main body according to various embodiments of the present disclosure.

As shown in FIGS. 3, 6 and 7, the image forming apparatus 100 also includes a first driving head 60, a contact pin assembly, and a first positioning matching part 11 arranged in the installation cavity. The first positioning matching part 11 and the first driving head 60 are opposite to the first end of the toner cartridge along the second direction. The contact pin assembly includes a plurality of contact pins. A portion of the contact pin is electrically connected to the main body 10, and another portion of the contact pin is exposed in the installation cavity and is used to be electrically connected to the toner cartridge. Thus, the image forming apparatus 100 establishes communication with the toner cartridge through the contact pin assembly. The portion of the contact pin exposed to the installation cavity forms a first conductive contact 50.

Figure 4:
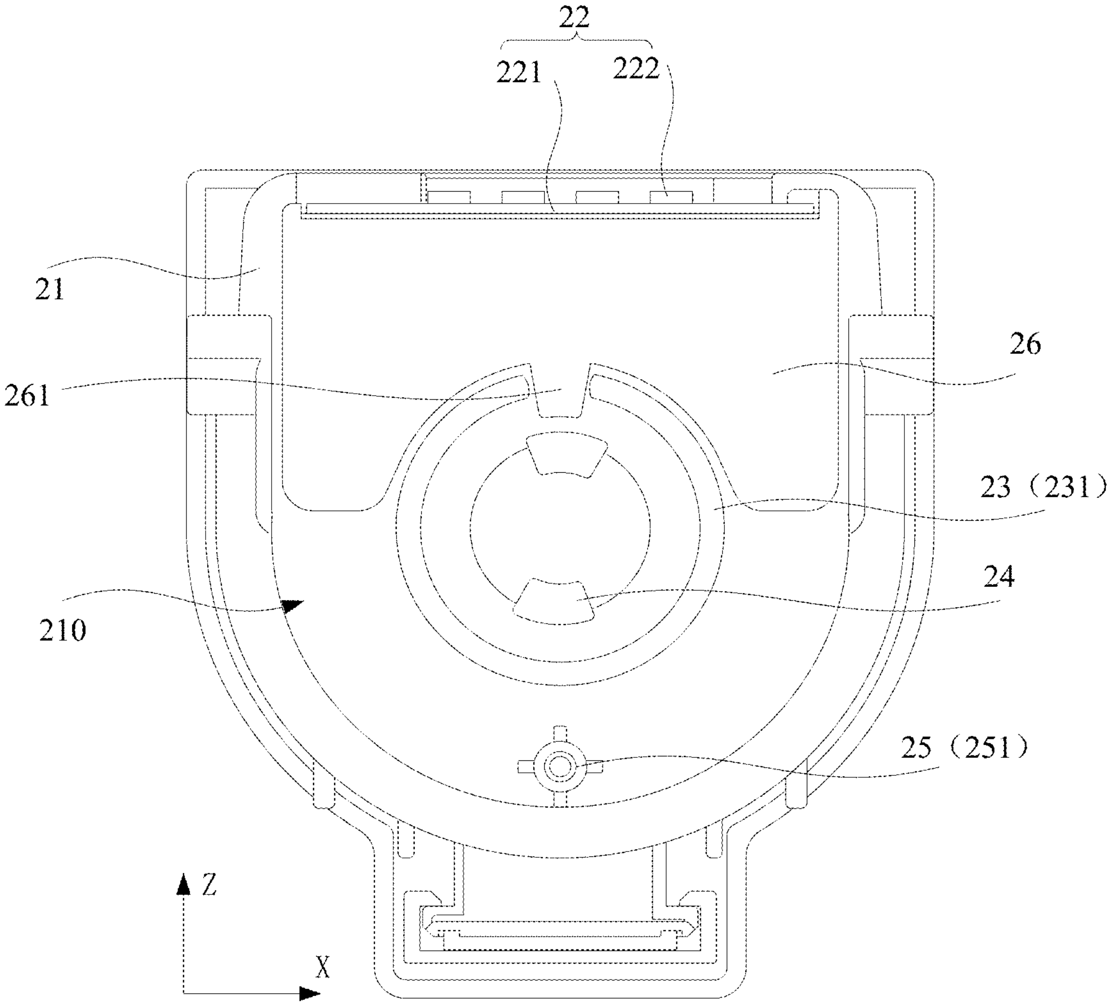
FIG. 4 illustrates a schematic structural diagram of a first end of a cartridge according to various embodiments of the present disclosure.

As shown in FIG. 4, the toner cartridge includes a housing 21 as well as a storage apparatus 22 and a first meshing part 24 arranged on the housing 21. The housing 21 as a whole is in a shape of an elongated strip. Along the second direction (the insertion direction of the toner cartridge), the housing 21 includes a first end and a second end arranged oppositely. The first end is opposite to the first driving head 60. The first meshing part 24 is arranged on an end surface of the first end of the housing 21. The first meshing part 24 is arranged opposite to the first driving head 60, and the first meshing part 24 matches with the first driving head 60. When the toner cartridge is inserted into the installation cavity and installed in place, the first driving head 60 can be transmission-connected to the first meshing part 24 to input a driving force to the toner cartridge. This rotates a toner transportation apparatus in the toner cartridge to realize the supply of toner to the imaging assembly 30. The installation in place in the present disclosure is interpreted as the toner cartridge is installed in the image forming apparatus 100 and can perform image forming operations, such as normal printing and normal supply of toner.

The storage apparatus 22 is used to store the toner information of the toner cartridge. The storage apparatus 22 can be a chip of the toner cartridge. The storage apparatus 22 includes a substrate 221 and a plurality of communication terminals arranged on the substrate 221. The plurality of communication terminals is located on a side of the substrate 221 that contacts the first conductive contact 50. After the toner cartridge is inserted into the installation cavity and installed in place, the plurality of communication terminals contacts and is electrically connected with corresponding first conductive contacts 50.

For example, the storage apparatus 22 is arranged at the top of the housing 21 along the third direction. Accordingly, the first conductive contact 50 formed by the contact pin assembly is located below a top wall of the installation cavity, that is, when the toner cartridge is inserted into the installation cavity, the first conductive contact 50 is opposite to the chip.

Each communication terminal forms a second conductive contact 222, and multiple second conductive contacts 222 include a voltage common collector (VCC) contact, a serial data (SDA) contact, a ground (GND) contact, and a serial clock (SCL) contact. The VCC contact is used to contact and conduct with an external power supply unit to obtain the voltage required for the chip to work. The SDA contact is a data communication contact, the GND contact is a ground contact, and the SCL contact is a clock signal contact. Four second conductive contacts are respectively electrically connected to the corresponding first conductive contacts 50 to achieve electrical conduction between the chip and the main body 10.

Embodiments of the present disclosure further provides a positioning adapter, which can be installed on the housing 21 of the toner cartridge. The positioning adapter is used to position the toner cartridge when the toner cartridge is inserted into the installation cavity.

In embodiments of the present disclosure, the positioning adapter includes a first positioning part 23 that is detachably installed on the housing 21 of the toner cartridge. Further, the positioning adapter also includes a fixing part, which is configured to detachably dispose the first positioning part 23 on the housing 21 of the toner cartridge.

Exemplarily, the first positioning part 23 is located on the end surface of the first end of the housing 21, that is, the first positioning part 23 and the first meshing part 24 are both located on the end surface of the first end of the housing 21. The first positioning part 23 is arranged oppositely to the first positioning matching part 11. The first positioning part 23 matches with the first positioning matching part 11. For example, the first positioning part 23 can be a positioning protrusion, and the first positioning matching part 11 can be a positioning groove matching with the positioning protrusion, etc., and embodiments of the present disclosure do not limit.

Figure 5:
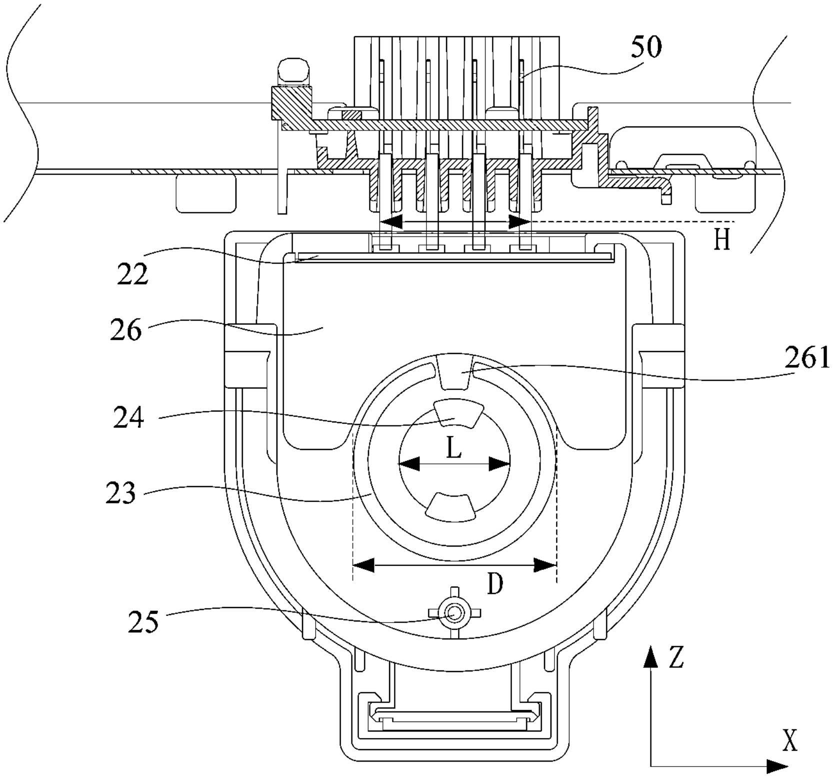
FIG. 5 illustrates a schematic diagram of a connection between a first conductive contact and a second conductive contact according to various embodiments of the present disclosure.

As shown in FIG. 5, when the toner cartridge with the positioning adapter is inserted into the installation cavity of the main body 10, the first positioning part 23 matches with the first positioning matching part 11 to position the first meshing part 24. Thus, the first meshing part 24 is transmission-connected with the first driving head 60, that is, the driving force of the first driving head 60 can be transmitted to the toner transportation apparatus in the toner cartridge through the first meshing part 24.

Further, when the toner cartridge is inserted into the installation cavity of the main body 10 and installed in place, the second conductive contact 222 of the toner cartridge contacts the first conductive contact 50 and forms a plurality of contacts. The maximum line distance between any two of multiple contacts where the first conductive contact 50 contacts the second conductive contact 222 on the transverse cross-section of the main body 10 (the distance H in FIG. 5) is less than or equal to the maximum width of the outermost contour of the first positioning part 23 on the transverse cross-section of the main body 10 (the width D in FIG. 5). The transverse cross section is the X direction shown in the figure.

Embodiments of the present disclosure configures the maximum width D of the outermost contour of the first positioning part 23 on the transverse cross-section of the main body 10 to be greater than or equal to the maximum line distance H between any two of the multiple contacts where the first conductive contact 50 contacts the second conductive contact 222 on the transverse cross-section of the main body 10.

This configuration can reduce the influence of the driving force from the first driving head 60 on the contact between the first conductive contact 50 and the second conductive contact 222. This avoids a relative movement between the first conductive contact 50 and the second conductive contact 222. Thus, the contact between the first conductive contact 50 and the second conductive contact 222 is more stable, ensuring the normal operation of the image forming apparatus 100.

Figure 8:
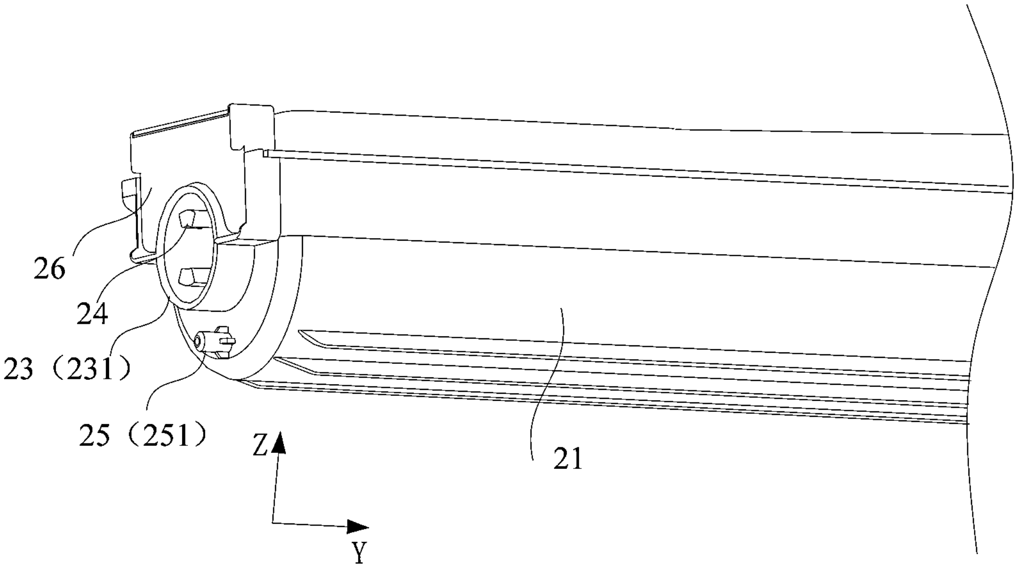
FIG. 8 illustrates a schematic structural diagram of a first positioning part and a second positioning part according to various embodiments of the present disclosure.

As shown in FIG. 8, in embodiments of the present disclosure, the first positioning part 23 can be integrated on the housing 21. For example, the first positioning part 23 can be configured as a first positioning cylinder 231 in an annular shape. The first positioning cylinder 231 is integrated on an end surface of the first end of the housing 21, and the first positioning cylinder 231 is arranged around the periphery of the first meshing part 24.

Figure 9:
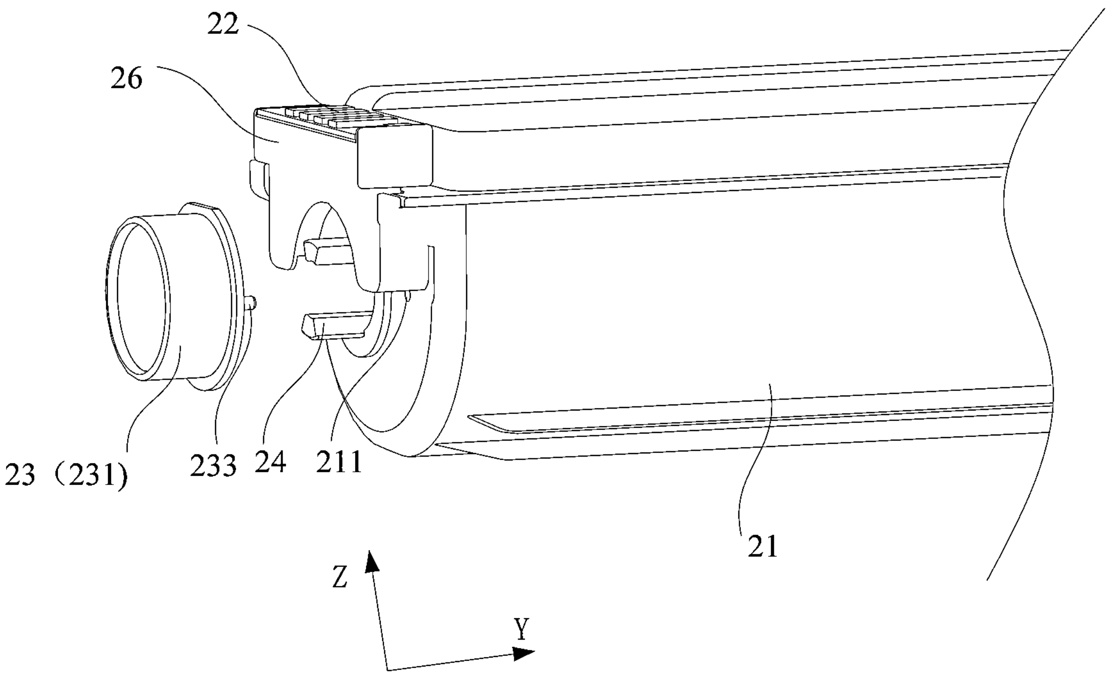
FIG. 9 illustrates a schematic diagram of the connection between the first positioning part and the housing according to various embodiments of the present disclosure.

In embodiments of the present disclosure, the first positioning part 23 is detachably installed on the housing 21 of the toner cartridge. As shown in FIG. 9, the first positioning part 23 is provided with at least one first plug-in column 233. Correspondingly, the housing 21 is provided with a first plug-in hole 211 that matches the first plug-in column 233. The first plug-in hole 211 can be located on the end face of the first end of the housing 21.

For example, the housing 21 of the toner cartridge includes an installation area 210. The first plug-in hole 211 is in the installation area 210 of the housing 21. When the positioning adapter needs to be installed on the toner cartridge, the first plug-in column 233 can be inserted into the first plug-in hole 211. Furthermore, the first positioning part 23 has a bottom surface on an end surface facing the first end. The bottom surface can be adhered to the end surface of the first end. This embodiment does not limit it.

In embodiments of the present disclosure, when the positioning adapter is installed on the toner cartridge, the first positioning part 23 is arranged around the outside of the first meshing part 24. Specific implementation is described below.

Continuing to refer to FIG. 9, in one embodiment, the first positioning part 23 is configured as a first positioning cylinder 231 in an annular shape. Along the insertion direction of the first positioning cylinder 231 (consistent with the Y-axis direction), the end surface of one end of the first positioning cylinder 231 is provided with an installation edge. The installation edge is arranged on a peripheral wall along the circumferential ring of the first positioning cylinder 231. The first positioning cylinder 231 can be installed on the end surface of the first end of the housing 21 through the installation edge, and the first positioning cylinder 231 is sleeved on the periphery of the first meshing part 24.

For example, the first plug-in column 233 is provided on a side of the installation edge facing the housing 21. The housing 21 is provided with a first plug-in hole 211 that matches the first plug-in column 233. The first positioning cylinder 231 is inserted into the first plug-in hole 211 through the first plug-in column 233, so that the first positioning cylinder 231 is installed on the housing 21. A side surface of a positioning edge can be adhered to the end surface of the first end of the housing 21.

It should be noted that the first positioning part 23 is configured as a first positioning cylinder 231. When the toner cartridge with the positioning adapter is inserted into the installation cavity of the main body 10 and installed in place, the first conductive contact 50 and the second conductive contact 222 are in contact and form a plurality of contacts. Among the plurality of contacts, the maximum line distance between any two contacts on the transverse cross-section of the main body 10 (the distance H in FIG. 5) is less than or equal to the diameter of the first positioning cylinder 231.

This configuration can reduce the influence of the driving force from the first driving head 60 on the contact between the first conductive contact 50 and the second conductive contact 222. This avoids the relative movement between the first conductive contact 50 and the second conductive contact 222. Thus, the contact between the first conductive contact 50 and the second conductive contact 222 is more stable.

Figure 10:
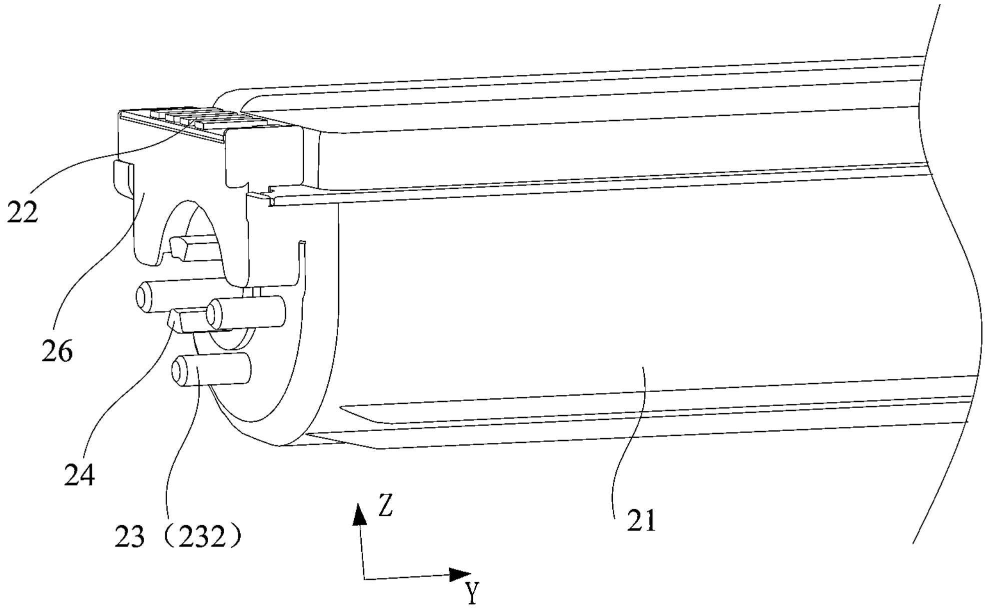
FIG. 10 illustrates another schematic structural diagram of the first positioning part according to various embodiments of the present disclosure.

As shown in FIG. 10, in another embodiment, the first positioning part 23 includes at least three first positioning columns 232, and each first positioning column 232 is arranged around the periphery of the first meshing part 24. Accordingly, the first positioning matching part 11 matching with the first positioning part 23 includes a first positioning hole. The first positioning hole matches with the first positioning column 232, so that the first positioning column 232 can be inserted into the first positioning hole, that is, the main body 10 of the image forming apparatus 100 is provided with a first positioning hole matching with the first positioning column 232. When the toner cartridge with the first positioning part 23 of this type is inserted into the installation cavity, each first positioning column 232 can be inserted into the corresponding first positioning hole, thereby realizing the positioning of the toner cartridge.

It should be noted that the first positioning part 23 is configured to be at least three first positioning columns 232. When the toner cartridge with the positioning adapter is inserted into the installation cavity of the main body 10 and installed in place, the first conductive contact 50 and the second conductive contact 222 are in contact and form a plurality of contacts. Among the plurality of contacts, the maximum line distance between any two contacts on the transverse cross-section of the main body 10 is less than or equal to the maximum width of the outermost contour surrounded by each first positioning column 232 on the transverse cross-section of the main body 10.

Furthermore, in embodiments of the present disclosure, each first positioning column 232 is located on a same circle. The center of the circle coincides with a rotation center of the first meshing part 24, that is, the circle formed by each first positioning column 232 is concentric with the circle formed by the rotation path of the first meshing part 24.

When the toner cartridge with the positioning adapter is inserted into the installation cavity and installed in place, the first conductive contact 50 and the second conductive contact 222 contact to form a plurality of contacts, among which the maximum line distance between any two contacts on the transverse cross-section of the main body 10 is less than or equal to the diameter of the circle.

Continuing to refer to FIG. 5 and FIG. 6, the toner cartridge of embodiments of the present disclosure is also provided with a first bracket 26. The first bracket 26 is arranged on the housing 21 of the toner cartridge. The first bracket 26 is used to install the storage apparatus 22 and dispose the storage apparatus 22 on the top of the housing 21.

For example, the first bracket 26 is L-shaped, including a horizontal bearing part and an installation part connected to each other. The installation part is located below the horizontal bearing part along the third direction. The first bracket 26 is installed on the end surface of the first end of the housing 21 through the installation part. The horizontal bearing part is arranged on the top of the housing 21, and the substrate 221 of the chip is installed on a bearing surface of the horizontal bearing part, in the Y direction, and the end surface of the substrate 221 is flush with an end of a bearing surface of the horizontal bearing part.

Furthermore, the first bracket 26 is also provided with a first limiting protrusion 261. Along the third direction, the first limiting protrusion 261 is located on a side of the installation part away from the horizontal bearing part. The first limiting protrusion 261 extends along the third direction into the first positioning part 23, and is opposite to the first driving head 60 along the second direction. This can limit the first meshing part 24 in the second direction to prevent the movement of the first meshing part 24 in the second direction, thereby improving the reliability of the transmission-connection between the first meshing part 24 and the first driving head 60.

When the first positioning part 23 is configured as a first positioning cylinder 231, a first notch is provided at a position of the first positioning cylinder 231 close to the first limiting protrusion 261. The first notch is provided matching with the first limiting protrusion 261 so that the first limiting protrusion 261 can be embedded in the first notch. When the positioning adapter with the first positioning cylinder 231 is installed on the toner cartridge, the first notch accommodates the first limiting protrusion 261. The first limiting protrusion 261 is opposite to the end surface of the first meshing part 24, axially limiting the first meshing part 24 in the second direction.

As shown in FIG. 3 to FIG. 5, the toner cartridge provided in embodiments of the present disclosure also includes a second positioning part 25. Correspondingly, the main body is provided with a second positioning matching part 12 adapted to the second positioning part 25. The second positioning part 25 is provided on the end surface of the first end of the housing 21. When the positioning adapter is installed on the toner cartridge, the first positioning part 23 and the second positioning part 25 are both located on the end surface of the first end. The first positioning part 23 is provided close to the second positioning part 25, and along the third direction, the first positioning part 23 is located above the second positioning part 25. When the toner cartridge is installed in the installation cavity of the main body 10, the first positioning part 23 and the second positioning part 25 can jointly position the toner cartridge.

In the scheme where the toner cartridge is positioned by the first positioning part 23 and the second positioning part 25, the first positioning part 23 includes at least one first positioning column 232. When the positioning adapter is installed on the toner cartridge, the first positioning column 232 is arranged along the rotation direction of the first meshing part 24 and is located on the periphery of the first meshing part 24.

For example, the first positioning part 23 includes three first positioning columns 232. When the toner cartridge with the positioning adapter is installed in the installation cavity of the main body 10 of the image forming apparatus and positioned, the three first positioning columns 232 are arranged around the periphery of the first meshing part 24. Moreover, the three first positioning columns 232 are all located on the concentric circle of the rotation path of the first meshing part 24, and the rotation path is the contour formed by the circumferential rotation of the outermost contour of the first meshing part 24. In another embodiment, the three first positioning columns 232 are located on a non-concentric circle of the rotation path of the first meshing part 24, which is not limited here.

Further, the second positioning part 25 includes at least one second positioning column 251. A second positioning matching part 12 includes a second positioning hole matching with the second positioning column 251. The second positioning column 251 can be configured as a pre-positioning column. When the toner cartridge with the first positioning part 23 is inserted into the installation cavity, it can be pre-positioned by using the second positioning column 251, and further positioned by using the first positioning part 23. This configuration can facilitate the positioning and installation of the toner cartridge.

Furthermore, the toner cartridge is only provided with the first positioning part 23, and the second positioning part 25 is omitted. When the toner cartridge with the first positioning part 23 is inserted into the installation cavity, the first positioning part 23 is used for further positioning, and the installation positioning of the toner cartridge can also be achieved.

Embodiment II

Based on Embodiment I, embodiments of the present disclosure provide an adapter, which can be installed on the toner cartridge. When the toner cartridge needs to be inserted into the installation cavity of the main body 10 of the image forming apparatus, the adapter can be used for positioning. Thus, the first meshing part 24 on the toner cartridge is transmission-connected with the first driving head 60, and the driving force of the first driving head 60 is transmitted to the toner cartridge. The toner transportation apparatus in the toner cartridge rotates under the action of the driving force and can provide toner to the imaging assembly 30.

The difference between this embodiment and Embodiment I is that the toner cartridge includes a storage apparatus 22 and an installation part of the first meshing part 24. That is, the first meshing part 24 is no longer integrated on the housing 21 of the toner cartridge. For example, the first meshing part 24 is integrated on the adapter. When the toner cartridge needs to be inserted into the installation cavity, the adapter can be installed on the toner cartridge, thereby installing the first meshing part 24 on the toner cartridge.

Furthermore, the adapter also includes a first positioning part 23, and the first positioning part 23 is configured to, when the toner cartridge with the first meshing part 24 and the first installation part is inserted into the installation cavity and installed in place, cooperate with the first positioning matching part 11 and act jointly to position the first meshing part 24. Thus, the first meshing part 24 is transmission-connected to the first driving head 60.

When the toner cartridge is inserted into the main body 10 and installed in place, the second conductive contact 222 of the toner cartridge contacts the first conductive contact 50 to form a plurality of contacts. The maximum line distance between any two contacts on the transverse cross-section of the main body 10 (the distance H in the figure) is less than or equal to the maximum width of the outermost contour of the first positioning part 23 on the transverse cross-section of the main body 10 (the width D in the figure).

This configuration can reduce the influence of the driving force from the first driving head 60 on the contact between the first conductive contact 50 and the second conductive contact 222, to avoid the relative movement between the first conductive contact 50 and the second conductive contact 222. This makes the contact between the first conductive contact 50 and the second conductive contact 222 more stable, thereby ensuring the normal operation of the image forming apparatus 100.

The adapter provided in this embodiment includes not only the first positioning part 23, but also the first meshing part 24. For example, in one embodiment, the first positioning part 23 and the first meshing part 24 are integrated in the adapter. As the adapter is detachably installed on the housing 21 of the toner cartridge, it realizes the installation of the first positioning part 23 and the first meshing part 24 respectively on the housing 21. This embodiment does not limit.

When the toner cartridge with the adapter is inserted into the installation cavity and installed in place, the second conductive contact 222 of the toner cartridge contacts the first conductive contact 50 and forms a plurality of contacts. The maximum line distance between any two contacts on the transverse cross-section of the main body 10 (the distance H in the figure) is greater than the maximum width of the outermost contour of the first meshing part 24 on the transverse cross-section of the main body 10 of the image forming apparatus (the width L in the figure). That is, the distance H is greater than the width L but less than or equal to the width D.

This configuration can further reduce the influence of the driving force from the first driving head 60 on the contact between the first conductive contact 50 and the second conductive contact 222, to avoid the relative movement between the first conductive contact 50 and the second conductive contact 222. The contact between the first conductive contact 50 and the second conductive contact 222 is more stable, thereby ensuring the normal operation of the image forming apparatus 100.

In another embodiment, the adapter includes a first fixing part, and the first fixing part is configured to detachably dispose the first positioning part 23 on the housing 21 of the toner cartridge. The adapter also includes a second fixing part, configured to detachably dispose the first meshing part 24 on the housing 21 of the toner cartridge. That is, the first fixing part and the first meshing part 24 can be detachably installed on the housing 21 of the toner cartridge, respectively.

In another embodiment, a first plug-in column 233 is provided on the housing 21 of the toner cartridge, and the first positioning part 23 is provided with a first plug-in column 233. The first plug-in column 233 is used to be inserted into the first plug-in hole 211 to install the first positioning part 23 on the cartridge. The specific implementation plan can be found in Embodiment I and will not be repeated here.

Based on the above embodiment, when the toner cartridge is installed with the first positioning part 23 and the first meshing part 24, the first positioning part 23 is arranged around the outside of the first meshing part 24 to ensure that when the toner cartridge is inserted into the installation cavity and installed in place, the second conductive contact 222 of the toner cartridge contacts the first conductive contact 50 and forms a plurality of contacts. The maximum line distance between any two contacts on the transverse cross-section of the main body 10 (the distance H in the figure) is greater than the maximum width of the outermost contour of the first meshing part 24 on the transverse cross-section of the main body 10 of the image forming apparatus (the width L in the figure). The maximum line distance between any two contacts on the transverse cross-section of the main body 10 (the distance H in the figure) is less than or equal to the maximum width of the outermost contour of the first positioning part 23 on the transverse cross-section of the main body 10 (the width D in the figure).

It should be noted that, in one embodiment, the first positioning part 23 can be configured as a first positioning cylinder 231 in an annular shape. The matching scheme of the first positioning cylinder 231 and the first limiting protrusion 261 of the first bracket 26 installed on the toner cartridge can refer to the relevant description in Embodiment I, which will not be repeated here. In another embodiment, the first positioning part 23 includes at least three first positioning columns 232. The positional relationship between the three first positioning columns 232 and the first meshing part 24, and the matching scheme of the three first positioning columns 232 and the first positioning hole of the main body 10 of the image forming apparatus can refer to the relevant description in Embodiment I, which will not be repeated here.

Based on the above embodiment, the toner cartridge of this embodiment further includes a second positioning part 25. When the adapter is installed on the housing 21, the second positioning part 25 and the first positioning part 23 are both located on the end surface of the first end of the housing 21, and along the third direction, the first positioning part 23 is located above the second positioning part 25. When the toner cartridge is installed in the installation cavity of the main body 10, the first positioning part 23 and the second positioning part 25 can work together to position the toner cartridge. It should be noted that the specific arrangement scheme of the second positioning part 25 of the toner cartridge can refer to the relevant description of Embodiment I, which will not be repeated here.

Embodiment III

Based on Embodiments I and II, this embodiment provides a toner cartridge. The toner cartridge includes a housing 21. The housing 21 includes an installation area 210, and the installation area 210 is used to install the positioning adapter described Embodiment I, or the installation area 210 is used to install the adapter described in Embodiment II.

Specifically, the housing 21 as a whole is in a shape of an elongated strip. Along the second direction (the insertion direction of the toner cartridge into the installation cavity), the housing 21 includes a first end and a second end that are opposingly arranged. The end surface of the first end of the housing 21 is configured as the installation area 210 of the housing 21. The end surface of the first end of the housing 21 is used to install a positioning adapter or an adapter.

For example, the positioning adapter or the adapter includes a first positioning part 23. The first positioning part 23 is provided with a first plug-in column 233. The end surface of the first end of the housing 21 is provided with a first plug-in hole 211 that matches with the first plug-in column 233. The first positioning part 23 can be plugged into the first plug-in hole 211 through the first plug-in column 233, and then the first positioning part 23 can be installed in the installation area 210 of the housing 21.

Embodiment IV

The toner cartridge provided in this embodiment is detachably arranged on the main body 10 of the image forming apparatus 100. The main body 10 of the image forming apparatus includes an installation cavity, and the installation cavity can accommodate at least one toner cartridge. The image forming apparatus 100 also includes a first driving head 60, a first conductive contact 50, and a first positioning matching part 11. The first driving head 60, the first conductive contact 50, and the first positioning matching part 11 are all arranged in the installation cavity.

Furthermore, when the toner cartridge is inserted into the installation cavity, the first positioning matching part 11 is used to position the toner cartridge to ensure that the toner cartridge is installed in place. The first conductive contact 50 is used to be electrically connected to the toner cartridge so that a printed circuit and the toner cartridge are electrically connected and communicated. The first driving head 60 is used to be transmission-connected to the toner cartridge to provide driving force to the toner cartridge so that the toner transportation apparatus in the toner cartridge rotates. Then, the toner cartridge provides toner to the imaging assembly 30 of the image forming apparatus 100.

The toner cartridge provided in embodiments of the present disclosure includes a housing 21, a first meshing part 24, a first positioning part 23, and a storage apparatus 22. The housing 21 as a whole is in the shape of an elongated strip, and along the second direction (the insertion direction of the toner cartridge into the installation cavity), the housing 21 includes a first end and a second end that are oppositely arranged. The end surface of the first end of the housing 21 is configured as an installation area 210 of the housing 21, and the first meshing part 24 and first positioning part 23 are arranged in the installation area 210.

The first meshing portion 24 is configured such that when the toner cartridge is inserted into the installation cavity and installed in place, the first meshing part 24 can be transmission-connected with the first driving head 60. The driving force from the first driving head 60 is transmitted to the housing 21 through the first meshing part 24, thereby driving the toner transportation apparatus in the toner cartridge to rotate. The first positioning part 23 is configured such that when the toner cartridge is inserted into the installation cavity and installed in place, the first positioning part 23 matches with the first positioning matching part 11 to jointly position the first meshing part 24. The first meshing part 24 is transmission-connected with the first driving head 60.

The storage apparatus 22 is used to store toner information of the toner cartridge. The storage apparatus 22 includes a substrate 221, a chip arranged on the substrate 221, and multiple communication terminals. A communication terminal is located on a side of the substrate 221 that contacts a contact pin. After the toner cartridge is inserted into the installation cavity and installed in place, the communication terminal contacts and electrically connects with a corresponding contact pin.

Each of the communication terminal can be configured as the second conductive contact 222 of the storage apparatus 22, and the contact pin can be configured as the first conductive contact 50 of the image forming apparatus 100. Thus, after the toner cartridge is inserted into the installation cavity and installed in place, the second conductive contact 222 is configured to contact and electrically connect with the first conductive contact 50.

Furthermore, when the toner cartridge is inserted into the main body 10 and installed in place, the second conductive contact 222 of the toner cartridge contacts the first conductive contact 50 to form a plurality of contacts. The maximum line distance between any two contacts on the transverse cross-section of the main body 10 (the distance H in the figure) is less than or equal to the maximum width of the outermost contour of the first positioning part 23 on the transverse cross-section of the main body 10 (the width D in the figure).

This embodiment configures the maximum width D of the outermost contour of the first positioning part 23 on the transverse cross-section of the main body 10 to be greater than or equal to the maximum line distance H between any two of the multiple contacts of the first conductive contact 50 and the second conductive contact 222 on the transverse cross-section of the main body 10. Such a configuration can reduce the influence of the driving force from the first driving head 60 on the contact between the first conductive contact 50 and the second conductive contact 222, thereby avoiding the relative movement between the first conductive contact 50 and the second conductive contact 222. Thus, the contact between the first conductive contact 50 and the second conductive contact 222 is more stable, thereby ensuring the normal operation of the image forming apparatus 100.

Based on the above embodiment, when the toner cartridge provided in this embodiment is inserted into the installation cavity and installed in place, the second conductive contact 222 of the toner cartridge contacts the first conductive contact 50 and forms a plurality of contacts. The maximum line distance between any two contacts on the transverse cross-section of the main body 10 (the distance H in the figure) is greater than the maximum width of the outermost contour of the first meshing part 24 on the transverse cross-section of the main body 10 of the image forming apparatus (the width L in the figure). The distance H is greater than the width L and less than or equal to the width D.

This configuration can further reduce the influence of the driving force from the first driving head 60 on the contact between the first conductive contact 50 and the second conductive contact 222, to avoid the relative movement between the first conductive contact 50 and the second conductive contact 222. The contact between the first conductive contact 50 and the second conductive contact 222 is more stable, ensuring the normal operation of the image forming apparatus 100.

The first positioning part 23 is detachably installed on the housing 21. For example, as shown in FIG. 9, in Embodiment I, the first positioning part 23 can be configured as a first positioning cylinder 231 in an annular shape. The housing 21 is provided with a first plug-in hole 211. The first positioning part 23 is provided with a first plug-in column 233. The first plug-in column 233 is used to be inserted into the first plug-in hole 211, so that the first positioning part 23 is detachably installed on the housing 21.

For a matching scheme of the first positioning cylinder 231 and the first limiting protrusion 261 installed on the first bracket 26 of the toner cartridge, please refer to the relevant description in Embodiment I, which will not be repeated here.

In another embodiment, the first positioning part 23 is integrally formed with the housing 21. For example, as shown in FIG. 8, the first positioning part 23 can be configured as a first positioning cylinder 231 in an annular shape, the first positioning cylinder 231 is integrated on the end surface of the first end of the housing 21. The first positioning cylinder 231 is arranged around the periphery of the first meshing part 24.

Alternatively, as shown in FIG. 10, the first positioning part 23 includes at least three first positioning columns 232. The three first positioning columns 232 are integrated on the end surface of the first end of the housing 21. Thus, the first positioning part 23 and the housing 21 are integrally formed.

For the positional relationship between the three first positioning columns 232 and the first meshing part 24 in this embodiment, and the matching scheme between the three first positioning columns 232 and the first positioning hole of the main body 10 of the image forming apparatus, please refer to the relevant description in Embodiment I, which will not be repeated here.

The toner cartridge of embodiments of the present disclosure also includes a second positioning part 25. When the adapter is installed on the housing 21, the second positioning part 25 and the first positioning part 23 are both located on the end surface of the first end of the housing 21, and along the third direction, the first positioning part 23 is located above the second positioning part 25. When the toner cartridge is installed in the installation cavity of the main body 10, the first positioning part 23 and the second positioning part 25 work together to position the toner cartridge. For the specific arrangement scheme of the second positioning part 25 of the toner cartridge, please refer to the relevant description of Embodiment I, which will not be repeated here.

Figure 11:
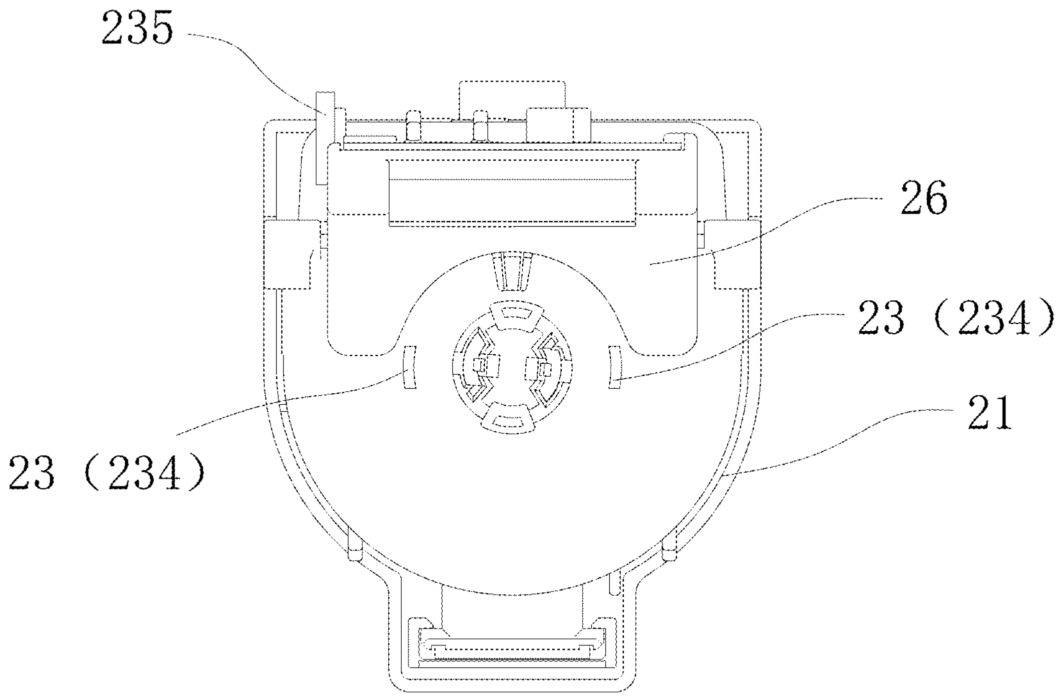
FIG. 11 illustrates another schematic structural diagram of the first positioning part according to various embodiments of the present disclosure.

In another embodiment, as shown in FIG. 11, the first positioning part 23 in embodiments of the present disclosure includes at least two first positioning columns 234, and the two first positioning columns 234 are integrated on the end surface of the first end of the housing 21. Thus, the first positioning part 23 is integrally formed with the housing 21.

For the positional relationship between the two first positioning columns 234 and the first meshing part 24 in this embodiment, and the matching scheme between the two first positioning columns 234 and the first positioning hole of the main body 10 of the image forming apparatus, please refer to the relevant description in Embodiment I, which will not be repeated here.

The toner cartridge of embodiments of the present disclosure also includes a second positioning part 235. When the adapter is installed on the housing 21, the second positioning part 235 is integrated on the top of the housing 21 and extends along the third direction. The second positioning part 235 is integrally formed with the housing 21, or the second positioning part 235 is detachably installed on the housing 21, and the second positioning part 235 is elastically telescopically movable with respect to the housing 21, which is not limited here. Further, along the third direction, the first positioning part 23 is located below the second positioning part 235. When the toner cartridge is installed in the installation cavity of the main body 10, the first positioning part 23 and the second positioning part 235 can jointly position the toner cartridge.

Embodiment V

This embodiment provides a cartridge assembly, which can be detachably installed on a main body 10 of an image forming apparatus 100, and includes a plurality of toner cartridges in various embodiments mentioned above.

Specifically, the main body 10 of the image forming apparatus is rectangular, and is provided with an installation cavity, for example, the installation cavity is rectangular, or irregularly shaped, and a front end of the installation cavity has an opening. In this embodiment, the cartridge assembly can include at least one toner cartridge, and the cartridge assembly can be inserted into the installation cavity, that is, the cartridge assembly can be detachably installed on the main body 10.

Referring to FIG. 1, along the third direction, the cartridge assembly can be arranged above the imaging assembly 30, and the cartridge assembly includes four cartridges arranged in sequence along the first direction. Each cartridge can contain toner of different colors, and this embodiment is not limited to this. When the toner cartridge is installed in the installation cavity and positioned, the toner cartridge can provide toner to the imaging assembly 30, and the toner cartridge establishes electrical connection for communicating with the image forming apparatus 100.

Specifically, the imaging assembly 30 includes a photosensitive drum, a cleaning blade, a discharger, a charging assembly, and a developing assembly. The charging assembly can make the surface of the photosensitive drum uniformly charged. An exposure assembly exposes and scans the photosensitive drum through a laser so that the uniformly charged surface of the photosensitive drum carries an electrostatic latent image, which is developed by the developing assembly and toner and transferred to the intermediate transfer belt. After the transfer is completed, the cleaning blade removes the toner remaining on the surface of the photosensitive drum, and the discharger removes the charge remaining on the photosensitive drum, so that the photosensitive drum is ready for the next imaging.

Embodiment VI

An image forming apparatus 100 provided in this embodiment includes a main body 10 and a cartridge 20 in the above embodiment or a cartridge assembly in the above embodiment. The cartridge can be a toner cartridge, and the toner cartridge or the cartridge assembly may be detachably installed in the main body 10. With such a configuration, when the toner in the toner cartridge is exhausted, a new toner cartridge can be easily replaced.

Embodiment VII

An image forming apparatus 100 provided in this embodiment includes a main body and a cartridge 20. In the cartridge type shown in this embodiment, a photosensitive drum, a charging roller, and a developing device storing toner are integrated to form a cartridge. The cartridge is configured to be removable from the main body 10 of the image forming apparatus 100. Further, although the cartridge is described as an example above, the present disclosure is not limited to this. For example, a developing cartridge including toner and a developing device without a photosensitive drum can be used. A toner cartridge that does not include a roller can also be used. Alternatively, a photosensitive drum cartridge that does not include a developing device but integrates a photosensitive drum and a charging roller can also be used.

Embodiment VIII

Figure 12:
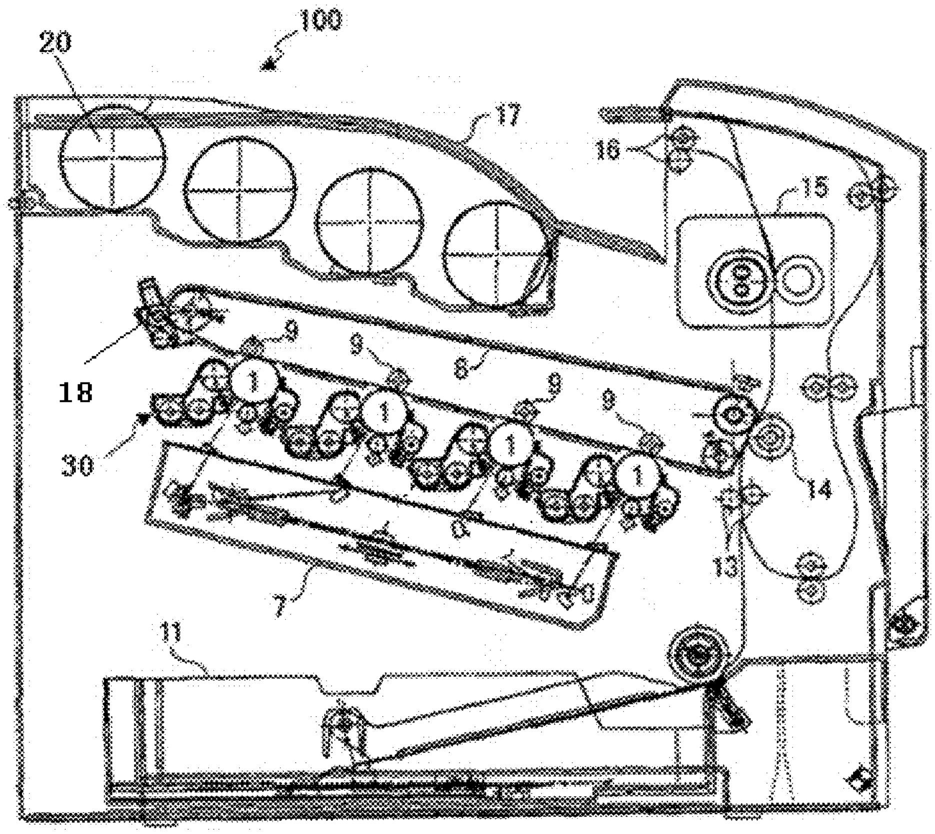
FIG. 12 illustrates a schematic structural diagram of an image forming apparatus according to one specific embodiment of the present disclosure.

This embodiment provides an image forming apparatus. As shown in FIG. 12, the image forming apparatus 100 includes a main body, an imaging assembly 30, and a cartridge 20. Specifically, the image forming apparatus 100 can be provided with four imaging assemblies 30 and four cartridges 20. The four imaging assemblies 30 respectively contain yellow, magenta, cyan, and black toner, and the corresponding four cartridges 20 can be toner cartridges, respectively containing yellow, magenta, cyan and black toners. In addition, the four imaging assemblies 30 have a same structure. When the toner is exhausted, a toner cartridge transfers the toner inside to the imaging assembly 30. Further, when the toner in the toner cartridge is exhausted, the user can replace the new toner cartridge. In addition, to facilitate the replacement of the toner cartridge, the toner cartridge is detachably connected to the main body.

Specifically, the imaging assembly 30 includes a photosensitive drum 1, a cleaning blade, a discharger, a charging assembly, and a developing assembly. The charging assembly can uniformly charge the surface of the photosensitive drum 1. The exposure assembly 7 exposes and scans the photosensitive drum 1 by laser, so that the uniformly charged surface of the photosensitive drum 1 carries an electrostatic latent image. The electrostatic latent image is developed by the developing assembly and toner, and transferred to the intermediate transfer belt 8. After the transfer is completed, the cleaning blade removes the toner remaining on the surface of the photosensitive drum 1, and the discharger removes the charge remaining on the photosensitive drum 1. The photosensitive drum 1 is ready for the next imaging.

More specifically, an intermediate transfer unit is arranged above the four imaging assemblies 30, and the intermediate transfer unit includes four primary transfer bias rollers 9, a cleaning assembly 18, and an annular intermediate transfer belt 8, etc. The intermediate transfer belt 8 is arranged between a primary transfer bias roller 9 and the photosensitive drums 1 of the imaging assemblies 30, and respectively forms a primary transfer nip area. An exposure assembly 7 is arranged below the four imaging assemblies 30, and at least a portion of a paper feeding unit is arranged below the exposure assembly 7. The paper feeding unit includes a paper cassette 11, a paper feeding roller, and a transmission roller 13. The paper cassette 11 contains paper, and the uppermost paper contacts the paper feeding roller, so that the paper can be transmitted to the transmission roller 13 under the action of the paper feeding roller. The transmission roller 13 clamps the paper and can transmit the paper to a secondary transfer nip area at an appropriate time.

In a primary transfer process, toner presses the transfer bias element with an opposite polarity on a surface of the intermediate transfer belt 8 and the photosensitive drum 1. The toner can be transferred to the intermediate transfer belt 8. As the intermediate transfer belt 8 passes through the photosensitive drums 1 with the four imaging assemblies in sequence, images formed by the four colors of toner are superimposed, thereby forming a toner image, and completing the primary transfer. In a secondary transfer process, the paper is inserted between the intermediate transfer belt 8 and a secondary transfer roller 14 (secondary transfer nip area). Thus, the toner image is transferred to the paper, and then the paper passes through the fixing assembly 15. The fixing assembly 15 uses heat and pressure to fix the toner image on the paper. Finally, the paper is discharged to the outside of the image forming apparatus 100 under the action of the discharge roller 16. In addition, the image forming apparatus 100 is also provided with a stacking assembly 17, and the paper discharged from the discharge roller 16 to the outside of the image forming apparatus 100 can be stacked one-by-one on the stacking assembly 17.

Various embodiments or implementation methods in this specification are described in a progressive manner. Each embodiment focuses on differences from other embodiments. The same or similar parts between various embodiments can be referenced to each other.

It should be noted that the phrases "one embodiment", "an embodiment", "an exemplary embodiment", "some embodiments", etc., mentioned in the specification indicate that the described embodiments may include certain features, structures, or characteristics, but not every embodiment may include the certain features, structures, or characteristics. In addition, such phrases do not necessarily refer to the same embodiment. When a certain feature, structure or characteristic is described in conjunction with an embodiment, it is within the knowledge of those persons of skilled in the art to implement such feature, structure, or characteristic in conjunction with other embodiments, whether explicitly or not explicitly described.

In general, terms should be understood, at least in part, by the context in which they are used. For example, the term "one or more" as used herein may be used to describe any feature, structure, or characteristic in a singular sense, or may be used to describe a combination of features, structures, or characteristics in a plural sense, depending, at least in part, on the context. Similarly, terms such as "a," "an," or "the" may also be understood to convey singular usage or to convey plural usage, depending, at least in part, on the context.

It should be easily understood that "on", "above", and "over" in the present disclosure should be interpreted in the broadest manner, so that "on" not only means "directly on something", but also includes the meaning of "on something" with intervening features or layers therebetween, and "above" or "over" not only includes the meaning of "above" or "over", but also may include the meaning of "above" or "over something" with no intervening features or layers therebetween (i.e., directly on something).

It should be noted that the above embodiments are only used to illustrate the technical solutions of the present disclosure, rather than to limit it. Although the present disclosure has been described in detail with reference to embodiments, those persons of skilled in the art should understand that they can still modify the technical solutions described in embodiments, or replace some or all the technical features therein with equivalents. However, these modifications or replacements do not cause the essence of the corresponding technical solutions to deviate from the scope of the technical solutions of embodiments of the present disclosure.

What is claimed is:

1. A positioning adapter, installed on a cartridge, wherein the cartridge is detachably disposed on a main body of an image forming apparatus; the main body of the image forming apparatus comprises a first driving head, a first conductive contact, and a first positioning matching part; the cartridge comprises a storage apparatus and a first meshing part; the storage apparatus comprises a second conductive contact;

the positioning adapter comprises a first positioning part; the first positioning part is configured to, when the cartridge with the positioning adapter is inserted into the main body of the image forming apparatus and installed in place, cooperate with the first positioning matching part to position the first meshing part, stabilizing a transmission-connection between the first meshing part and the first driving head; and when the cartridge with the positioning adapter is inserted into the main body of the image forming apparatus and installed in place, the first conductive contact contacts the second conductive contact; and a maximum width of an outermost contour of the first positioning part on a transverse cross-section of the main body of the image forming apparatus is greater than or equal to a maximum line distance between any two of multiple contacts where the first conductive contact contacts the second conductive contact on the transverse cross-section of the main body of the image forming apparatus.

2. The positioning adapter according to claim 1, further comprising a fixing part that is configured to detachably dispose the first positioning part on a housing of the cartridge.

3. The positioning adapter according to claim 1, wherein a first plug-in hole is disposed on a housing of the cartridge; the first positioning part is provided with a first plug-in column; the first plug-in column is configured to be inserted into the first plug-in hole, installing the positioning adapter on the cartridge.

4. The positioning adapter according to claim 1, wherein when the positioning adapter is installed on the cartridge, the first positioning part is disposed around a periphery of the first meshing part.

5. The positioning adapter according to claim 4, wherein the first positioning part is configured as a first positioning cylinder in an annular shape; when the cartridge with the positioning adapter is inserted into the main body of the image forming apparatus and installed in place, the first conductive contact contacts the second conductive contact; and a diameter of the first positioning cylinder is greater than or equal to the maximum line distance between any two of the multiple contacts where the first conductive contact contacts the second conductive contact on the transverse cross-section of the main body of the image forming apparatus;

wherein the cartridge is provided with a first bracket; the first bracket is configured to install the storage apparatus; and the first bracket is provided with a first limiting protrusion; and the first positioning cylinder is provided with a first notch; when the positioning adapter is installed on the cartridge, the first limiting protrusion is in the first notch, and the first limiting protrusion is arranged opposite to an end surface of the first meshing part to axially limit the first meshing part.

6. The positioning adapter according to claim 1, wherein the first positioning part comprises at least three first positioning columns; the at least three first positioning columns are arranged around a periphery of the first meshing part; and the at least three first positioning columns are respectively used to match with a plurality of first positioning holes arranged on the main body of the image forming apparatus;

the at least three first positioning columns are located on a same circle, and a center of the circle coincides with a rotation center of the first meshing part; and when the cartridge is inserted into the main body of the image forming apparatus and installed in place, the first conductive contact contacts the second conductive contact; and a diameter of the circle is greater than or equal to the maximum line distance between any two of the multiple contacts where the first conductive contact contacts the second conductive contact on the transverse cross-section of the main body of the image forming apparatus; or the cartridge comprises a second positioning part, and when the positioning adapter is installed on the cartridge, the first positioning part is near the second positioning part, and the first positioning part is located above the second positioning part;

the first positioning part comprises at least one first positioning column; and the first positioning column is arranged along a rotation direction of the first meshing part and is located at the periphery of the first meshing part.

7. An adapter, which is detachably installed on a cartridge, wherein the cartridge is detachably disposed on a main body of an image forming apparatus; the main body of the image forming apparatus comprises a first driving head, a first conductive contact, and a first positioning matching part;

the cartridge comprises a storage apparatus and an installation part for installing a first meshing part; and the storage apparatus comprises a second conductive contact;

the adapter comprises a first positioning part; the first positioning part is configured to, when the cartridge with the first positioning part and the first meshing part is inserted into the main body of the image forming apparatus and installed in place, cooperate with the first positioning matching part to position the first meshing part, stabilizing a transmission-connection between the first meshing part and the first driving head; and when the cartridge with the first positioning part is inserted into the main body of the image forming apparatus and installed in place, the first conductive contact contacts the second conductive contact; and a maximum width of an outermost contour of the first positioning part on a transverse cross-section of the main body of the image forming apparatus is greater than or equal to a maximum line distance between any two of multiple contacts where the first conductive contact contacts the second conductive contact on the transverse cross-section of the main body of the image forming apparatus.

8. The adapter according to claim 7, wherein the first positioning part is arranged around an outside of the first meshing part, the first positioning part is configured as a first positioning cylinder in an annular shape, when the cartridge is installed with the first positioning part and the first meshing part, the cartridge is inserted into an installation cavity and installed in place, the second conductive contact of the cartridge contacts the first conductive contact, the maximum width of the outermost contour of the first positioning part on the transverse cross-section of the main body is greater than or equal to the maximum line distance between any two contacts on the transverse cross-section of the main body.

9. The adapter according to claim 7, wherein the cartridge also provided with a first bracket, the first bracket is configured to be used for installing the storage apparatus; and the first bracket is provided with a first limiting protrusion; and a first positioning cylinder is provided with a first notch; the first limiting protrusion is in the first notch; and the first limiting protrusion is arranged opposite to an end surface of the first meshing part to axially limit the first meshing part.

10. A cartridge, which is detachably disposed on a main body of an image forming apparatus, wherein the image forming apparatus comprises a first driving head, a first conductive contact, and a first positioning matching part; and the cartridge comprises:

a housing;

a first meshing part, configured to transmission-connect with the first driving head;

a first positioning part, which is disposed on the housing, being configured to, when the cartridge is inserted into the main body of the image forming apparatus and installed in place, cooperate with the first positioning matching part to position the first meshing part, stabilizing a transmission-connection between the first meshing part and the first driving head;

a storage apparatus, comprising a second conductive contact that is configured to electrically connect to the first conductive contact of the image forming apparatus; and when the cartridge is inserted into the main body of the image forming apparatus and installed in place, the first conductive contact contacting the second conductive contact; and a maximum width of an outermost contour of the first positioning part on a transverse cross-section of the main body of the image forming apparatus being greater than or equal to a maximum line distance between any two of multiple contacts where the first conductive contact contacts the second conductive contact on the transverse cross-section of the main body of the image forming apparatus.

11. The cartridge according to claim 10, wherein when the cartridge is inserted into the main body of the image forming apparatus and installed in place, the first conductive contact contacts the second conductive contact; and a maximum width of an outermost contour of the first meshing part on the transverse cross-section of the main body of the image forming apparatus is less than the maximum line distance between any two of the multiple contacts where the first conductive contact contacts the second conductive contact on the transverse cross-section of the main body of the image forming apparatus.

12. The cartridge according to claim 10, wherein the first positioning part is disposed around a periphery of the first meshing part.

13. The cartridge according to claim 12, wherein the first positioning part is configured as a first positioning cylinder in an annular shape; and when the cartridge is inserted into the main body of the image forming apparatus and installed in place, the first conductive contact contacts the second conductive contact; and a diameter of the first positioning cylinder is greater than or equal to the maximum line distance between any two of the multiple contacts where the first conductive contact contacts the second conductive contact on the transverse cross-section of the main body of the image forming apparatus.

14. The cartridge according to claim 13, further comprising a first bracket, wherein the first bracket is configured to be used for installing the storage apparatus; and the first bracket is provided with a first limiting protrusion; and the first positioning cylinder is provided with a first notch; the first limiting protrusion is in the first notch; and the first limiting protrusion is arranged opposite to an end surface of the first meshing part to axially limit the first meshing part.

15. The cartridge according to claim 10, wherein the first positioning part comprises at least three first positioning columns; the at least three first positioning columns are arranged around a periphery of the first meshing part; and the at least three first positioning columns are respectively used to match with a plurality of first positioning holes arranged on the main body of the image forming apparatus.

16. The cartridge according to claim 15, wherein the at least three first positioning columns are located on a same circle, and a center of the circle coincides with a rotation center of the first meshing part; and when the cartridge is inserted into the main body of the image forming apparatus and installed in place, the first conductive contact contacts the second conductive contact; and a diameter of the circle is greater than or equal to the maximum line distance between any two of the multiple contacts where the first conductive contact contacts the second conductive contact on the transverse cross-section of the main body of the image forming apparatus.

17. The cartridge according to claim 10, further comprising a second positioning part, wherein the second positioning part is disposed close to the first positioning part and is located below the first positioning part; and the second positioning part matches with a second positioning matching part arranged on the main body of the image forming apparatus.

18. The cartridge according to claim 17, wherein the second positioning part comprises at least one second positioning column; and the second positioning matching part, correspondingly matching with the at least one second positioning column, comprises at least one second positioning hole.

19. The cartridge according to claim 18, wherein the first positioning part comprises at least one first positioning column; and the first positioning column is arranged along a rotation direction of the first meshing part and is located at a periphery of the first meshing part.

20. The cartridge according to claim 10, wherein the first positioning part is integrally formed with the housing, or is detachably installed on the housing; and the housing of the cartridge is provided with a first plug-in hole; the first positioning part is provided with a first plug-in column; and the first plug-in column is configured to be inserted into the first plug-in hole.

* * * * *